US011964299B2

(12) United States Patent
Huang et al.

(10) Patent No.: US 11,964,299 B2
(45) **Date of Patent: *Apr. 23, 2024**

(54) METHOD FOR MANUFACTURING GOLF BALL HAVING MULTI-LAYERED PATTERN

(71) Applicant: FOREMOST GOLF MFG. LTD., Taipei (TW)

(72) Inventors: Chia-Sheng Huang, Taipei (TW); Chi-Ling Lin, Changhua County (TW); Chia-Cheng Wu, Changhua County (TW); Ching-Hsiang Liu, Yunlin County (TW)

(73) Assignee: FOREMOST GOLF MFG. LTD., Taipei (TW)

( * ) Notice: Subject to any disclaimer, the term of this patent is extended or adjusted under 35 U.S.C. 154(b) by 114 days.

This patent is subject to a terminal disclaimer.

(21) Appl. No.: 17/511,521

(22) Filed: Oct. 26, 2021

(65) Prior Publication Data

US 2022/0266293 A1 Aug. 25, 2022

(30) Foreign Application Priority Data

Feb. 24, 2021 (TW) ................................ 110106425

(51) Int. Cl.
*B05D 1/02* (2006.01)
*B05D 7/00* (2006.01)

(52) U.S. Cl.
CPC .................................... *B05D 1/02* (2013.01); *B05D 7/57* (2013.01)

(58) Field of Classification Search
None
See application file for complete search history.

(56) References Cited

U.S. PATENT DOCUMENTS

| | | | | |
|---|---|---|---|---|
| 6,245,386 B1 * | 6/2001 | Felker | A63B 37/0022 427/407.1 |
| 11,571,708 B2 * | 2/2023 | Huang | B05D 5/065 |
| 2003/0059551 A1 * | 3/2003 | Skrabski | A63B 37/12 427/261 |
| 2010/0151971 A1 * | 6/2010 | Mydlack | A63B 45/00 473/378 |
| 2010/0298069 A1 * | 11/2010 | Goodwin | A63B 37/00221 473/378 |
| 2013/0130838 A1 * | 5/2013 | Morgan | A63B 37/0043 473/377 |

FOREIGN PATENT DOCUMENTS

| | | |
|---|---|---|
| JP | 6357198 B2 | 7/2018 |
| TW | I445580 B | 7/2014 |
| TW | 201536431 A | 10/2015 |

* cited by examiner

*Primary Examiner* — Michael P. Rodriguez
(74) *Attorney, Agent, or Firm* — Li & Cai Intellectual Property Office

(57) ABSTRACT

A method for manufacturing a golf ball having a multi-layered pattern is provided. Firstly, a semi-finished product of the golf ball is provided and includes a ball-shaped body and a base layer covering an outer surface of the ball-shaped body. Then, the semi-finished product of the golf ball is rotated at a predetermined rotation speed, and a color paint is applied to the semi-finished product of the golf ball by spraying from each of an upper position, a middle position, and a lower position. The multi-layered pattern includes an upper-layer pattern area, a mid-layer pattern area, and a lower-layer pattern area that are different in color from each other.

9 Claims, 7 Drawing Sheets

METHOD FOR MANUFACTURING GOLF BALL HAVING MULTI-LAYERED PATTERN

CROSS-REFERENCE TO RELATED PATENT APPLICATION

This application claims the benefit of priority to Taiwan Patent Application No. 110106425, filed on Feb. 24, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for manufacturing a golf ball, and more particularly to a method for manufacturing a golf ball having a multi-layered pattern.

BACKGROUND OF THE DISCLOSURE

With the increase of living standards and emphasis on outdoor recreational activities, more and more people have taken an interest in playing golf, including men and women of different demographics. That is to say, male and female golf players of different professions or different ages can play together for purposes of competition and interaction. Such is the appeal of golf.

Golf sport is played with a rule allowing a hitter to choose a ball for use in his or her own interest. There are so many different types of golf balls on the market, and many brands of golf balls may be different in hardness, structure and swing speed level. Even the same manufacturer will launch golf balls with different characteristics, in which some golf balls advertise long flying distances, and others are good at exerting spin ability. Therefore, if a golfer cannot achieve a better score, he or she will try to change a ball to perform adjustments. In addition, various manufacturers have designed golf balls with myriad appearances and colors, if a user can choose a golf ball that matches a personal preference, he or she can engage in practice or competition with a higher level of enjoyment.

SUMMARY OF THE DISCLOSURE

In response to the above-referenced technical inadequacy, the present disclosure provides a method for manufacturing a golf ball having a multi-layered pattern. The multi-layered pattern can increase the aesthetics and ornamentality of the golf ball, thus contributing to the overall appeal of the golf ball.

In one aspect, the present disclosure provides a method for manufacturing a golf ball having a multi-layered pattern, including: (a) providing a semi-finished product of the golf ball that includes a ball-shaped body and a base layer covering an outer surface of the ball-shaped body; and (b) rotating the semi-finished product of the golf ball at a predetermined rotation speed, and applying a color paint to the semi-finished product of the golf ball from each of an upper position, a middle position, and a lower position by spraying, so as to form the multi-layered pattern on the base layer. The multi-layered pattern includes an upper-layer pattern area, a mid-layer pattern area, and a lower-layer pattern area that are different in color from each other.

In one embodiment of the present disclosure, the upper position is an upper diagonal position of the semi-finished product of the golf ball. The lower position is a lower diagonal position of the semi-finished product of the golf ball. The middle position is located between the upper diagonal position and the lower diagonal position.

In one embodiment of the present disclosure, in step (b), the semi-finished product of the golf ball is retained at a predetermined height and defines a horizontal reference plane. The semi-finished product of the golf ball is divided into two half portions by the horizontal reference plane. The upper diagonal position is above the horizontal reference plane, the lower diagonal position is below the horizontal reference plane, and the middle position is on the horizontal reference plane.

In one embodiment of the present disclosure, in step (b), the color paint applied from the upper position is sprayed onto the base layer along a first spray direction that is inclined downward at an angle from 20 degrees to 30 degrees relative to the horizontal reference plane. The color paint applied from the lower position is sprayed onto the base layer along a second spray direction that is inclined upward at an angle from 20 degrees to 30 degrees relative to the horizontal reference plane. The color paint applied from the middle position is sprayed onto the base layer along a third spray direction that is parallel to the horizontal reference plane.

In one embodiment of the present disclosure, a first sprayer is used to apply, from the upper position, the corresponding color paint which has a viscosity from 18 seconds to 22 seconds measured by a No. 4 Zahn cup and at a temperature from 24° C. to 25° C., under application conditions of the first sprayer that include an atomization pressure of 1-3.5 kg/cm$^2$. A second sprayer is used to apply, from the lower position, the corresponding color paint which has a viscosity from 18 seconds to 22 seconds measured by another No. 4 Zahn cup and at a temperature from 24° C. to 25° C., under application conditions of the second sprayer that include an atomization pressure of 1-3.5 kg/cm$^2$. A third sprayer is used to apply, from the middle position, the corresponding color paint which has a viscosity from 18 seconds to 22 seconds measured by yet another No. 4 Zahn cup and at a temperature from 24° C. to 25° C., under application conditions of the third sprayer that include an atomization pressure of 1-3.5 kg/cm$^2$.

In one embodiment of the present disclosure, the first sprayer has a first spraying head, a shortest horizontal distance between the first spraying head and a center point of the ball-shaped body is from 10 cm to 25 cm, and a shortest vertical distance between the first spraying head and the horizontal reference plane is from 4 cm to 10 cm. The second sprayer has a second spraying head, a shortest horizontal distance between the second spraying head and the center point of the ball-shaped body is from 10 cm to 25 cm, and a shortest vertical distance between the second spraying head and the horizontal reference plane is from 4 cm to 10 cm.

In one embodiment of the present disclosure, the method further includes a step where a self-cleaning process of each of the first sprayer, the second sprayer, and the third sprayer is performed after steps (a) and (b) are repeated for n times, where n is a positive integer.

In one embodiment of the present disclosure, the base layer includes one or more base color layers.

In one embodiment of the present disclosure, the method further includes a step of forming an outer cover layer on the base layer to cover the multi-layered pattern.

In one embodiment of the present disclosure, the outer cover layer includes one or more transparent coating layers.

One of the beneficial effects of the subject matter provided by the present disclosure is that, the method for manufacturing a golf ball having a multi-layered pattern can enable the golf ball to have a unique appearance that easily attracts attention during its service life, by virtue of "rotating the semi-finished product of the golf ball at a predetermined rotation speed, and applying a color paint to the semi-finished product of the golf ball from each of an upper position, a middle position, and a lower position by spraying, so as to form the multi-layered pattern on the base layer". Specifically, the appearance of the golf ball has a fine layer-by-layer effect, thus producing a unique visual effect. These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
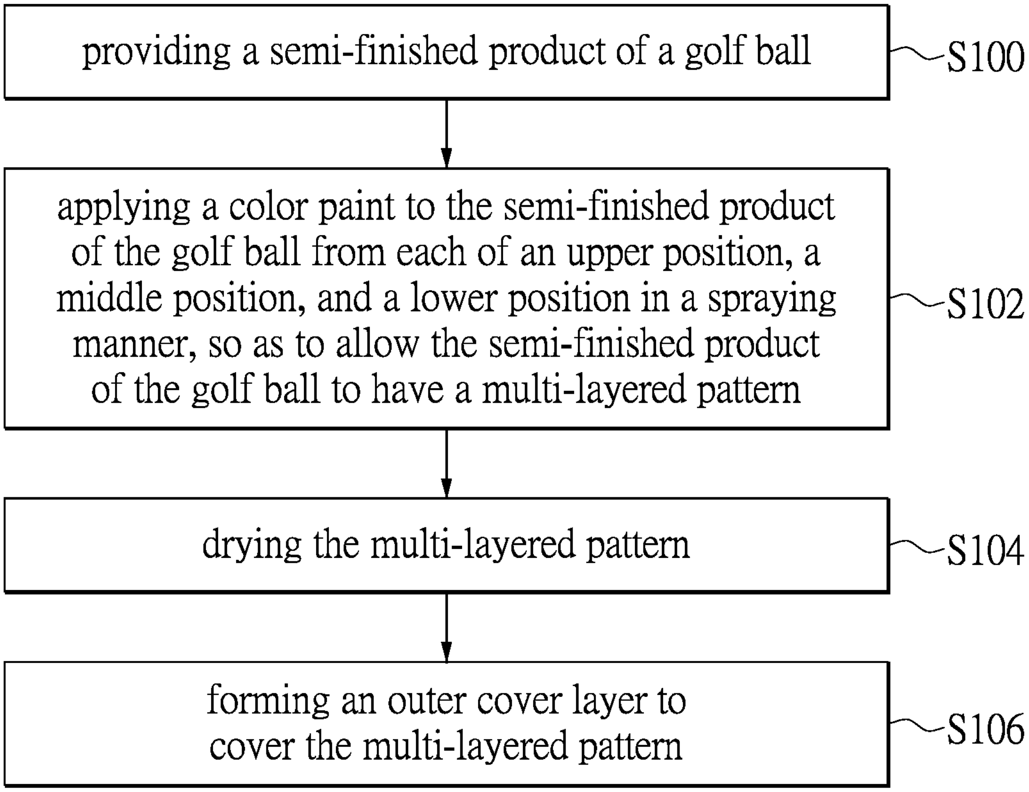
FIG. 1 is a flowchart of a method for manufacturing a golf ball having a multi-layered pattern of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1, an embodiment of the present disclosure provides a method for manufacturing a golf ball having a multi-layered pattern. The method mainly includes: step S100, providing a semi-finished product of a golf ball; and step S102, applying a color paint to the semi-finished product of the golf ball from each of an upper position, a middle position, and a lower position by spraying, so as to allow the semi-finished product of the golf ball to have a multi-layered pattern.

Figure 2:
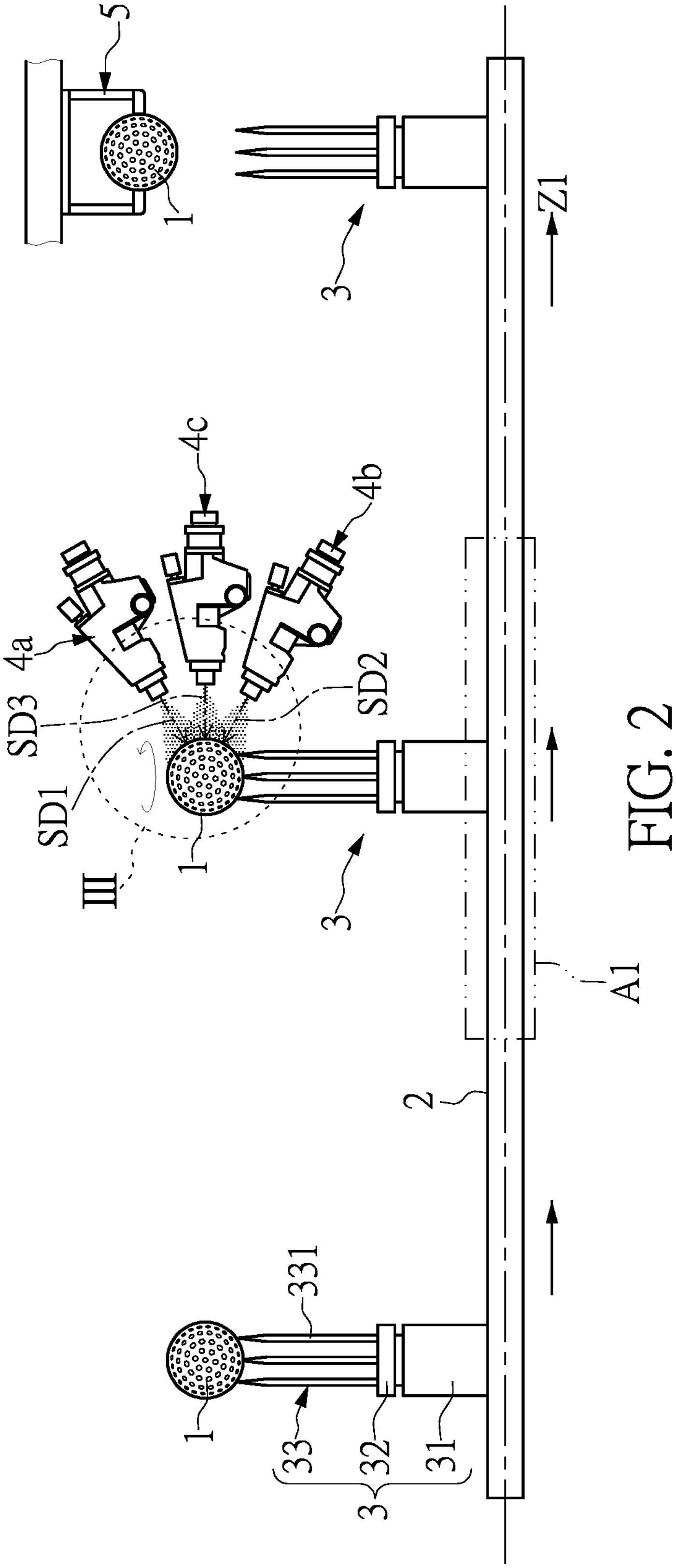
FIG. 2 is a schematic view showing a manufacturing process according to the method of the present disclosure.
Figure 3:
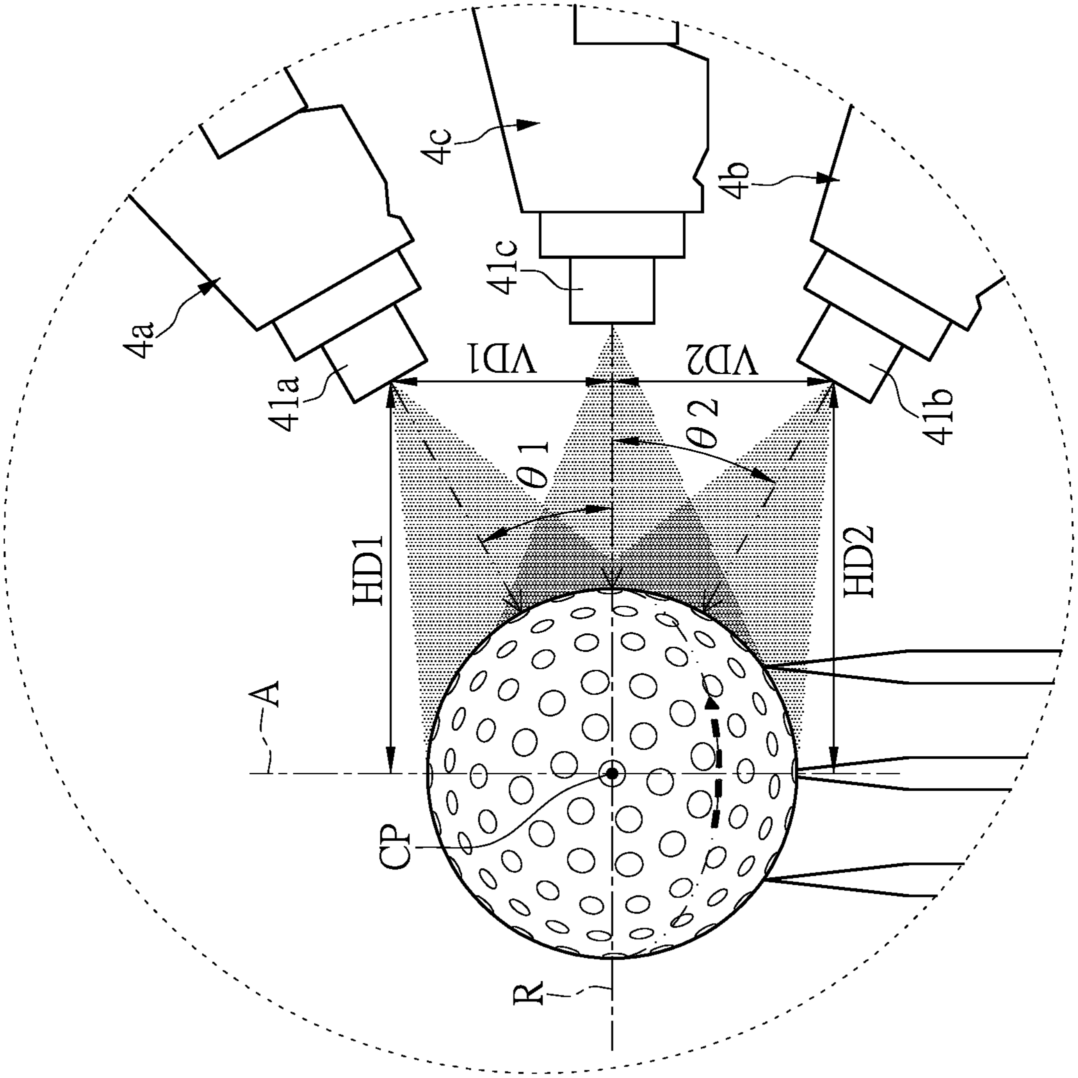
FIG. 3 is an enlarged view of part III of FIG. 2.

Reference is made to FIG. 2 and FIG. 3. In step S100, the semi-finished product 1 of the golf ball is brought into a processing area A1 along a predetermined path Z1, so as to manufacture the multi-layered pattern. In the present embodiment, the semi-finished product 1 of the golf ball is brought into the processing area A1 by a conveying device. The conveying device can include a first conveyor 2 configured to be parallel to a ground plane and at least one rotatable retainer 3 disposed on the first conveyor 2.

In use, the semi-finished product 1 of the golf ball can be retained at a predetermined height by the rotatable retainer 3 and define a rotation axis A and a horizontal reference plane R, as shown in FIG. 3. The rotation axis A passes through a center point CP of a ball-shaped body, and the horizontal reference plane R is perpendicular to the rotation axis A. The semi-finished product 1 of the golf ball can be rotated at a predetermined rotation speed by the rotatable retainer 3. Furthermore, the rotatable retainer 3, together with the semi-finished product 1 of the golf ball thereon, can be transported into the processing area A1 by the first conveyor 2.

More specifically, the first conveyor 2 can be a belt conveyor. The rotatable retainer 3 can include a driving assembly 31, a platform 32, and a first retaining element 33. The platform 32 can be disposed on the driving assembly 31 and parallel to the first conveyor 2. The first retaining element 33 can be disposed on the platform 32 and include at least three pointed bodies 331 extending upward from the platform 32. The above description is for exemplary purposes only, and is not intended to limit the scope of the present disclosure.

Figure 5:
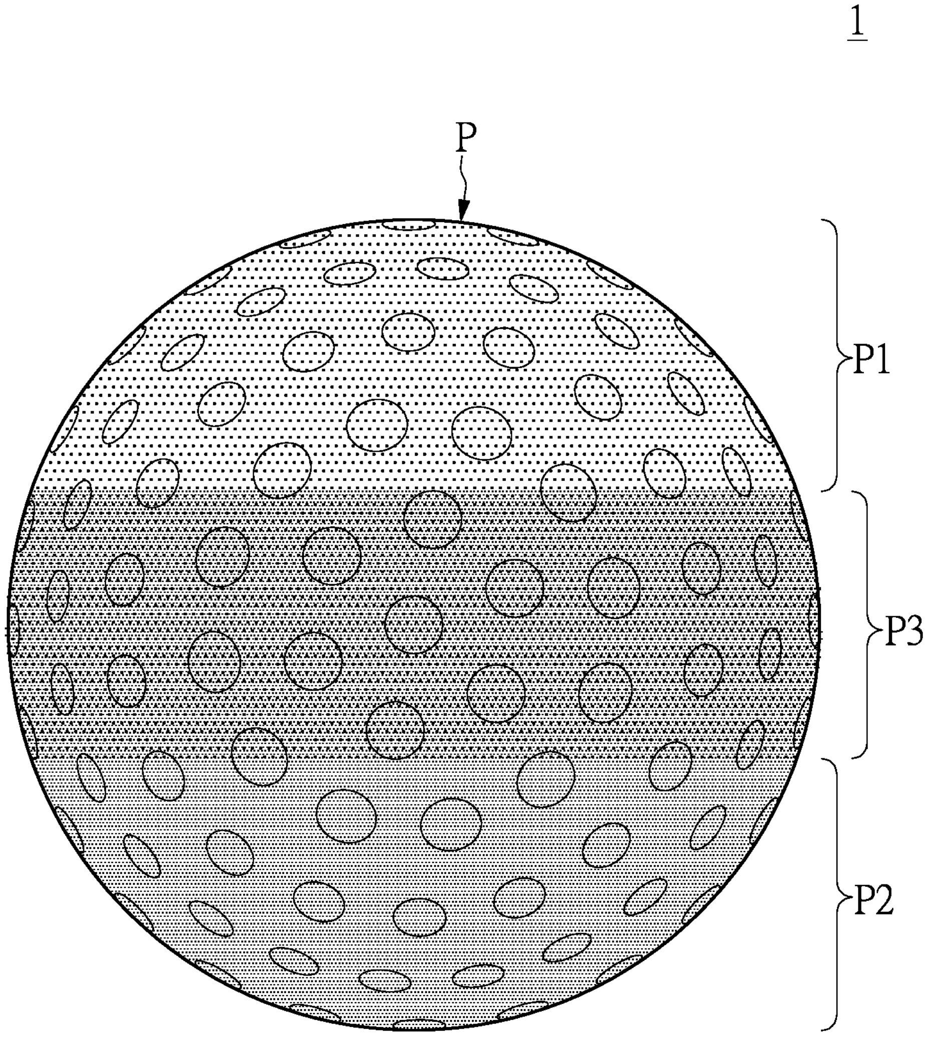
FIG. 5 is a schematic view showing an appearance of the golf ball manufactured by the method of the present disclosure.
Figure 6:
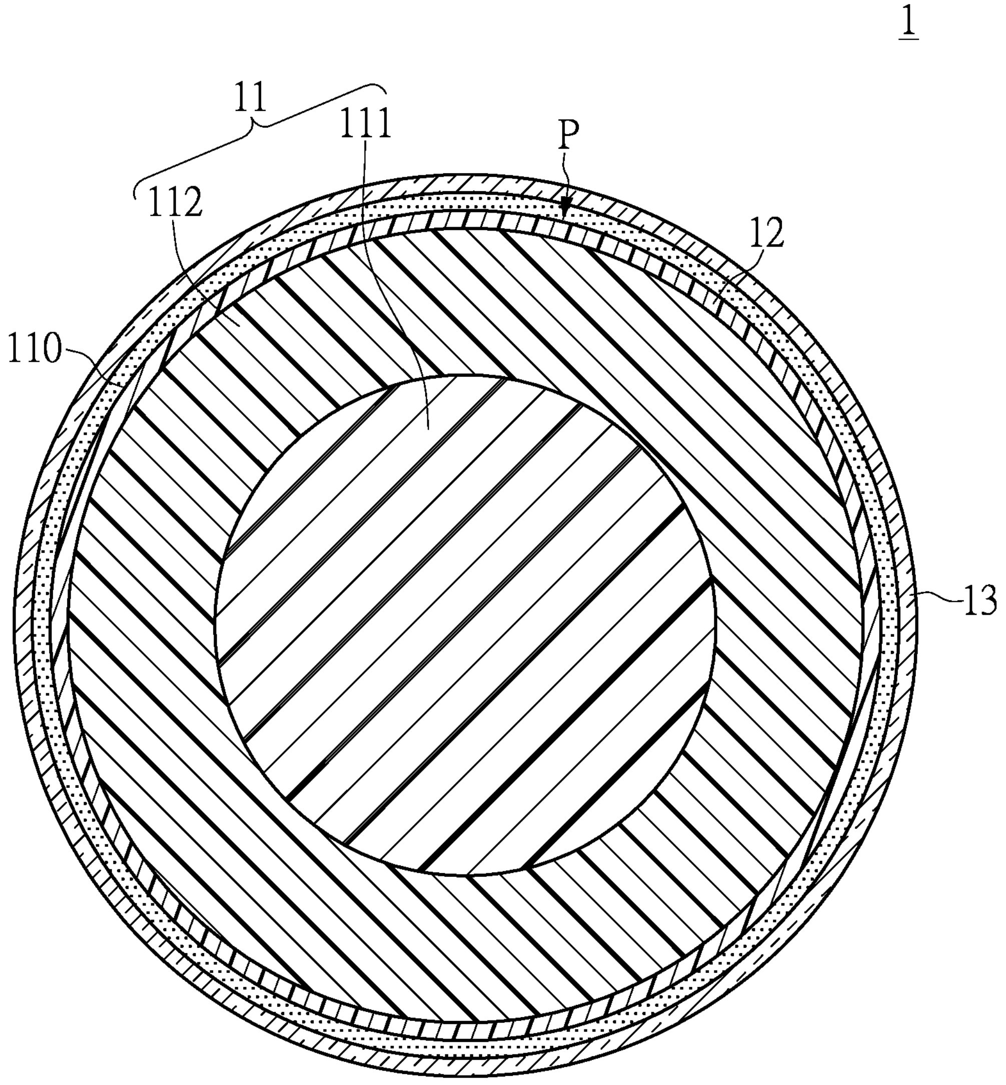
FIG. 6 is a cross-sectional view of the golf ball manufactured by the method of the present disclosure.

Reference is made to FIG. 5 and FIG. 6. The semi-finished product 1 of the golf ball can include a ball-shaped body 11 and a base layer 12 formed on an outer surface 110 of the ball-shaped body 11. In the present embodiment, the ball-shaped body 11 can be a double-layered structure that includes a ball core 111 and a ball shell 112 enclosing the ball core 111. The base layer 12 uniformly covers the entire outer surface 110 of the ball-shaped body 11. That is, a thickness of the base layer 12 on one point or area of the outer surface 110 is approximately the same as another thickness of the base layer 12 on another one point or area of the outer surface 110. The base layer 12 is formed to support and highlight the multi-layered pattern P, such that the color gradation of the multi-layered pattern P can become more apparent. In one embodiment that is not illustrated, the ball-shaped body 11 can be a multi-layered structure that further includes one or more mid layers (not shown) disposed between the ball core 111 and the ball shell 112.

More specifically, the ball core 111 and the ball shell 112 can be formed from any suitable material such as a polymer or an elastomer. The polymer can include one or more ionomers such as SURLYN® Resins (commercially available from DuPont), or can be a copolymer of one or more monomers (or oligomers) of one or more ionomers and non-ionomers. The elastomer (also known as rubber) can be an oligomer or polymer with elastic properties. Furthermore, the ball shell 112 can have a desired quantity of recessed portions with a desired shape, so as to reduce a gas drag effect on the golf ball during flight, thereby increasing the flight distance of the golf ball. The quantity of the recessed portions can be from 200 to 500, and preferably from 250 to 400. The cross-sectional shape of the recessed portions can be round or polygonal. The base layer 12 can have one or more base color layers such as white color layers. The base layer 12 can also have one or more base color layers and one or more outer color layers. The base color layer(s) and the outer color layer(s) show different colors. The above description is for exemplary purposes only, and is not intended to limit the scope of the present disclosure.

Figure 4:
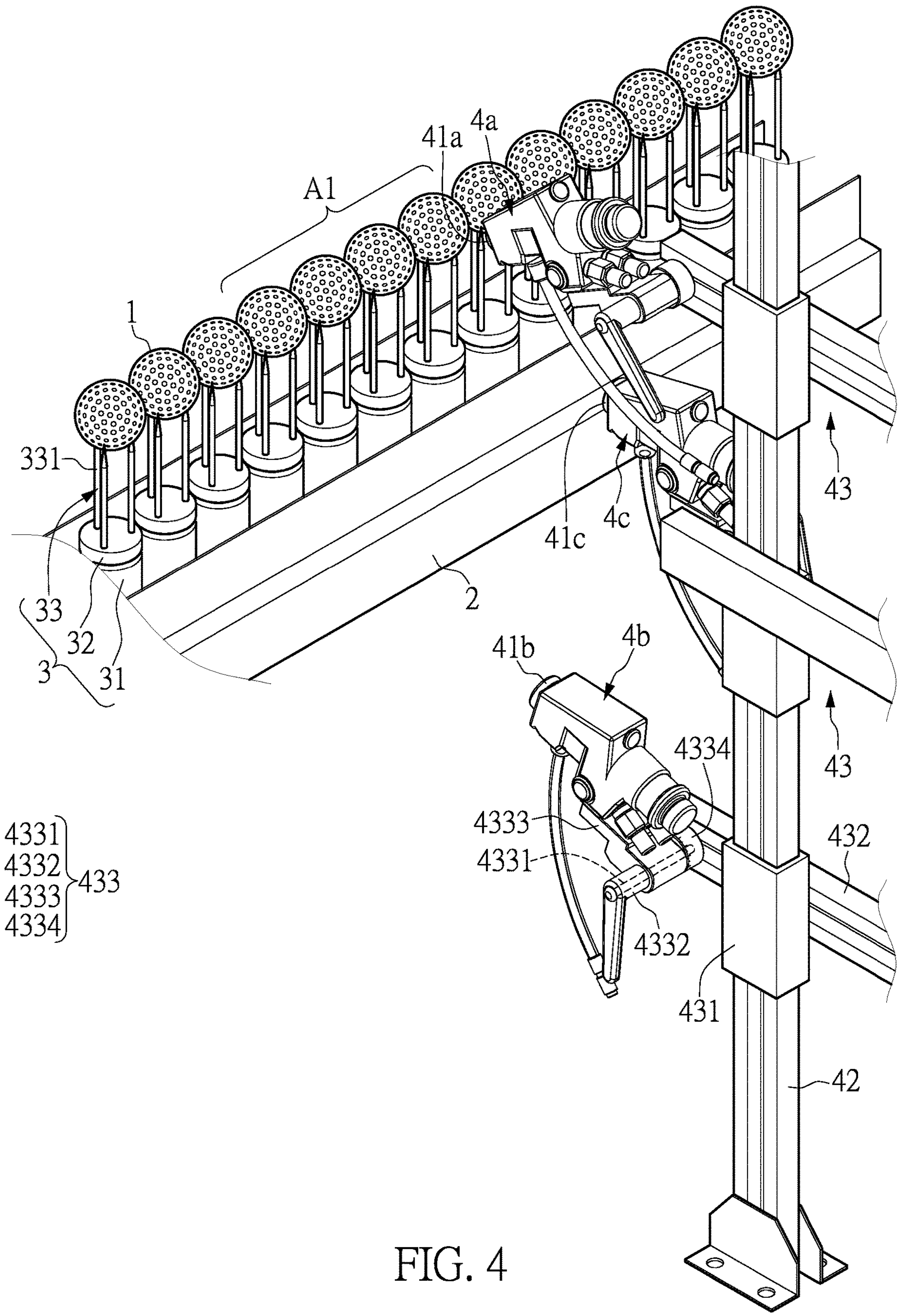
FIG. 4 is a schematic view showing another manufacturing process according to the method of the present disclosure.

Reference is made to FIG. 2 to FIG. 4, which is to be read in conjunction with FIG. 5 and FIG. 6. In step S102, the semi-finished product 1 of the golf ball is rotated at a predetermined rotation speed, and a color paint is applied to the semi-finished product 1 of the golf ball from an upper position, a middle position, and a lower position by spraying, so as to form a multi-layered pattern P on the base layer 12. The upper position is above the horizontal reference plane R, and is for example an upper diagonal position of the semi-finished product 1 of the golf ball. The lower position is below the horizontal reference plane R, and is for example a lower diagonal position of the semi-finished product 1 of the golf ball. The middle position is located between the upper diagonal position and the lower diagonal position. The multi-layered pattern P includes an upper-layer pattern area P1, a mid-layer pattern area P2, and a lower-layer pattern area P3 having different colors from each other, and such colors can be selected from original colors such as black, red, blue, purple, orange, yellow and green, any light color thereof, and any mixed color thereof. Therefore, the appearance of the golf ball can have a fine layer-by-layer effect so as to better attract attention.

More specifically, the semi-finished product 1 of the golf ball can be driven by the rotatable retainer 3 to rotate around the rotation axis A, a rotation speed of which can be 300 rpm. While the semi-finished product 1 of the golf ball is rotating, one or more color paints can be applied from the upper position, the lower position, and the middle position by using a first sprayer 4*a*, a second sprayer 4*b*, and a third sprayer 4*c*, respectively. In order to improve the fineness of the multi-layered pattern P, the first sprayer 4*a* and the second sprayer 4*b* can be symmetrically arranged at upper and lower sides of the horizontal reference plane R, in which the first sprayer 4*a* is inclined downward and the second sprayer 4*b* is inclined upward. The arrangement position of the third sprayer 4*c* is not particularly limited as long as the third sprayer 4*c* is arranged between the first sprayer 4*a* and the second sprayer 4*b*.

It should be noted that, as shown in FIG. 2 and FIG. 3, the color paint applied from the upper position and by the first sprayer 4*a* is sprayed onto the base layer 12 of the semi-finished product 1 of the golf ball along a first spray direction SD1 that is inclined downward at a predetermined angle θ1 relative to the horizontal reference plane R. The predetermined angle θ1 is from 20 degrees to 30 degrees. The color paint applied from the lower position and by the second sprayer 4*b* is sprayed onto the base layer 12 of the semi-finished product 1 of the golf ball along a second spray direction SD2 that is inclined upward at a predetermined angle θ2 relative to the horizontal reference plane R. The predetermined angle θ2 is from 20 degrees to 30 degrees. The color paint applied from the middle position and by the third sprayer 4*c* is sprayed onto the base layer 12 of the semi-finished product 1 of the golf ball along a third spray direction SD3. The third spray direction SD3 can be parallel to the horizontal reference plane R or inclined upward or downward at a predetermined angle (not shown) relative to the horizontal reference plane R, and is preferably parallel to the horizontal reference plane R.

In practice, as shown in FIG. 4, the first sprayer 4*a*, the second sprayer 4*b*, and the third sprayer 4*c* can be disposed on a support 42, in which the first sprayer 31 is in a downward inclined state, the second sprayer 32 is in an upward inclined state, and the third sprayer 4*c* is in an upward or downward inclined state or a horizontal state. The first sprayer 4*a*, the second sprayer 4*b*, and the third sprayer 4*c* are each a pressure feed spray gun (model name: SGD-71/SGD-RA100/SGD-RA-200 available from Taiwan Prona Industries Co., Ltd.). The color paint applied by each of the first sprayer 4*a*, the second sprayer 4*b*, and the third sprayer 4*c* has a viscosity from 18 seconds to 22 seconds that is measured by a No. 4 Zahn cup and at a temperature from 24° C. to 25° C., and application conditions of each of the first sprayer 4*a*, the second sprayer 4*b*, and the third sprayer 4*c* mainly include an atomization pressure of 1-3.5 $Kg/cm^2$. Furthermore, the first sprayer 4*a* has a first spraying head 41*a*, the second sprayer 4*b* has a second spraying head 41*b*, and the third sprayer 4*c* has a third spraying head 41*c*. The first sprayer 41*a* (or the second sprayer 41*b*/the third sprayer 41*c*) can spray the color paint to exhibit the appearance of fine dots, a pear skin texture, or disordered filaments by using different kinds of the first spraying head 41*a* (or the second spraying head 41*b*/the third spraying head 41*c*).

Based on the above application conditions, the shortest horizontal distance HD1 between the first spraying head 41*a* and the center point CP of the ball-shaped body 1 is from 10 cm to 25 cm, and is preferably from 12 cm to 20 cm. The shortest vertical distance VD1 between the first spraying head 41*a* and the horizontal reference plane R is from 4 cm to 10 cm, and is preferably 6 cm. Similarly, the shortest horizontal distance HD2 between the second spraying head 41*b* and the center point CP of the ball-shaped body 1 is from 10 cm to 25 cm, and is preferably from 12 cm to 20 cm. The shortest vertical distance VD2 between the second spraying head 41*b* and the horizontal reference plane R is from 4 cm to 10 cm, and is preferably 6 cm.

In order to increase flexibility and convenience of operation, each of the first sprayer 4*a*, the second sprayer 4*b*, and the third sprayer 4*c* can be fixedly connected to the support 42 by a position adjusting mechanism 43, and can be adjusted in height (i.e., the shortest vertical distance between the first, second or third spraying head and the horizontal reference plane) and spray angle (i.e., the inclination angle of the first, second or third spray direction) by the position adjusting mechanism 43. In the present embodiment, the position adjusting mechanism 43 can include a sliding member 431 (e.g., a sliding block), a supporting arm 432, and an angle adjusting assembly 433. The sliding member 431 is rotatably disposed on the support 42, and can slide along a height direction of the support 42. The supporting arm 432 can be fixedly connected to the sliding member 431. The angle adjusting assembly 433 can be installed at one end of the supporting arm 432 for fixing the first sprayer 4*a*, the second sprayer 4*b*, or the third sprayer 4*c* and adjusting its angle relative to the horizontal reference plane R.

More specifically, the angle adjusting assembly 433 can include a pivot 4331, an adjusting rod 4332, a fixing seat 4333, and a dial indicator 4334. The pivot 4331 can be fixedly connected to the one end of the supporting arm 432. The adjusting rod 4332 can be pivoted on the pivot 4331. The fixing seat 4333 can be integrated with the adjusting rod 4332. The dial indicator 4334 can be disposed at one side of the fixing seat 4333. For example, the dial indicator 4334 is disposed around the adjusting rod 4332 and located at the one side of the fixing seat 4333. The above description is for exemplary purposes only, and is not intended to limit the scope of the present disclosure.

In use, the first sprayer 4*a*, the second sprayer 4*b*, or the third sprayer 4*c* can be fixed to the fixing seat 4333, and the fixing seat 4333 can be rotated around the pivot 4331 until an alignment line thereon is aligned with a desired angle scale. Accordingly, the first sprayer 4*a*, the second sprayer 4*b*, or the third sprayer 4*c* can be in a desired inclined state. Furthermore, the first sprayer 4*a*, the second sprayer 4*b*, or the third sprayer 4*c* can be moved to a desired height position by moving up or down the corresponding sliding member 431. According to particular requirements (e.g., space constraints), the first sprayer 4*a*, the second sprayer 4*b*, and the third sprayer 4*c* can be staggered in a lateral direction through a left-right rotation of the sliding member(s) 431. In addition, a degree of freedom for movement and rotation of the sliding member(s) 431 can be restricted by a properly tight connection. The above description is for exemplary purposes only, and is not intended to limit the scope of the present disclosure.

It should be noted that, each of the first sprayer 4*a*, the second sprayer 4*b*, and the third sprayer 4*c* can have a self-cleaning function for removing residual color paint after being used for a period of time, thereby achieving a long-term normal and stable operation. In practice, a self-cleaning process of each of the first sprayer 4*a*, the second sprayer 4*b*, and the third sprayer 4*c* can be performed after step S100 and step S102 are repeated for n times, where n is a positive integer.

Figure 7:
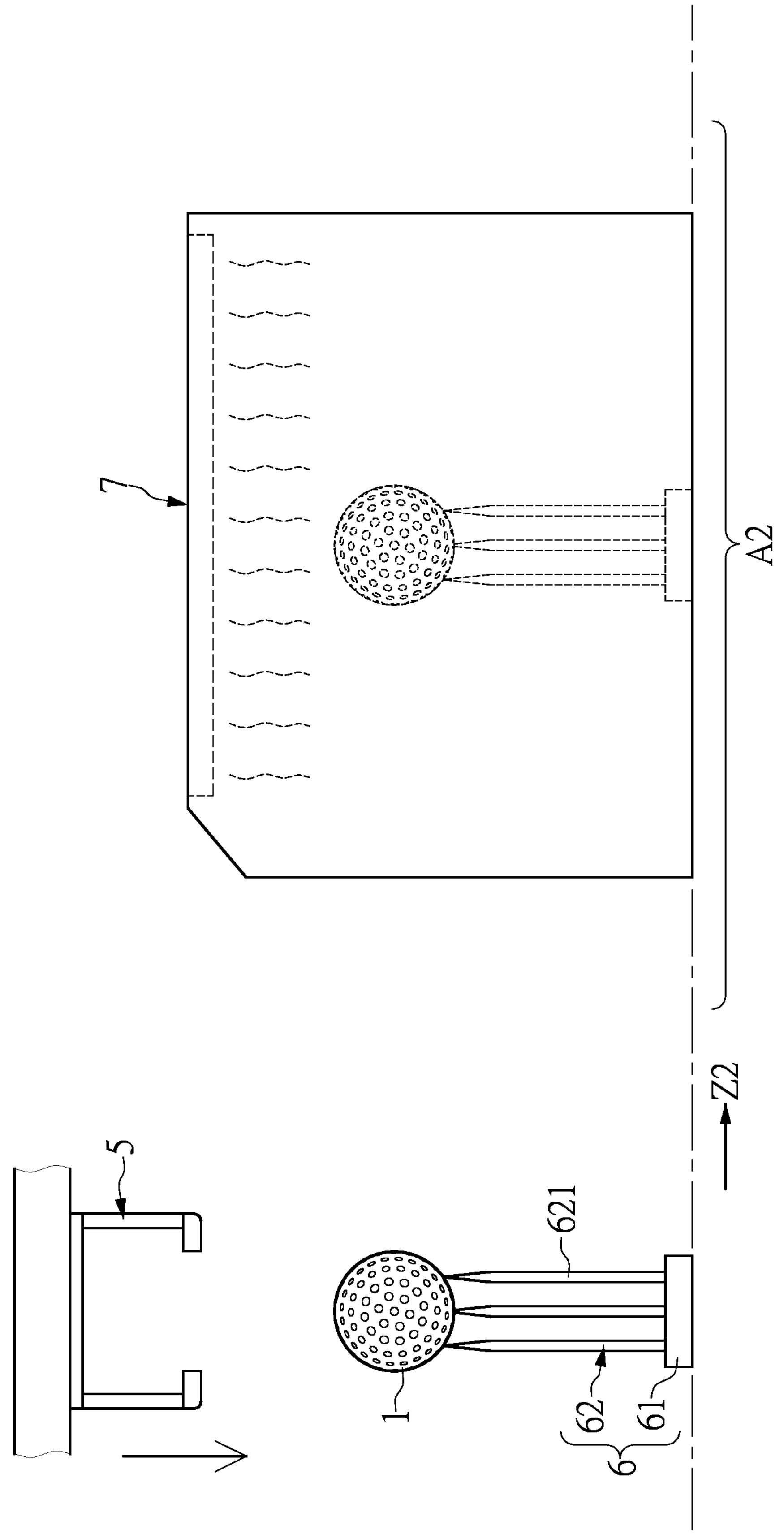
FIG. 7 is a schematic view showing yet another manufacturing process according to the method of the present disclosure.

Reference is made to FIG. 7, which is to be read in conjunction with FIG. 5. The method of the present disclosure can further include step S104, drying the multi-layered pattern P. In step S104, the semi-finished product 1 of the golf ball with the multi-layered pattern P is dried at a temperature from 50° C. to 60° C. for 20 minutes to 30 minutes, and is preferably dried at 55° C. for 24 minutes. Accordingly, the multi-layered pattern P can be firmly adhered to the base layer 12. More specifically, the semi-finished product 1 of the golf ball with the multi-layered pattern P is transported by a gripper 5 to another processing area A2 that is separated from the processing area A1, and is then moved by a second conveyor 6 into an effective heating range of a heater 7 to be dried.

More specifically, the second conveyor 6 can include at least one moving base 61 that has at least one second retaining element 62 disposed thereon. The at least one second retaining element 62 can include at least three pointed bodies 621 extending from the moving base 61. In use, the at least one second retaining element 62 is configured to receive the semi-finished product 1 of the golf ball with the multi-layered pattern P from the gripper 5, and to retain the semi-finished product 1 of the golf ball at a predetermined height. The moving base 61 is configured to move the semi-finished product 1 of the golf ball into the processing area A2 along another predetermined path Z2, so as to enter the effective heating range of the heater 7. The above description is for exemplary purposes only, and is not intended to limit the scope of the present disclosure. In addition, the method of the present disclosure can further include step S106, forming an outer cover layer 13 to cover the multi-layered pattern P. In step S106, the outer cover layer 13 is formed in a continuous shape and covers an outer surface of the base layer 12 entirely. The outer cover layer 13 can include one or more transparent coating layers. Accordingly, the durability of the golf ball can be increased, and the multi-layered pattern P can remain clear and intact during the service life of the golf ball.

Beneficial Effects of the Embodiments

One of the beneficial effects of the subject matter provided by the present disclosure is that, the method for manufacturing a golf ball having a multi-layered pattern can enable the golf ball to have a unique appearance that easily attracts attention during its service life, by virtue of "rotating the semi-finished product of the golf ball at a predetermined rotation speed, and applying a color paint to the semi-finished product of the golf ball from each of an upper position, a middle position, and a lower position by spraying, so as to form the multi-layered pattern on the base layer". Specifically, the appearance of the golf ball has a fine layer-by-layer effect, thus producing a unique visual effect.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for manufacturing a golf ball having a multi-layered pattern, comprising the following steps:

(a) providing a semi-finished product of the golf ball, wherein the semi-finished product of the golf ball includes a ball-shaped body and a base layer covering an outer surface of the ball-shaped body; and (b) rotating the semi-finished product of the golf ball at a predetermined rotation speed, and applying a color paint to the semi-finished product of the golf ball from each of an upper position, a middle position, and a lower position by spraying, so as to form the multi-layered pattern on the base layer, wherein a first sprayer is used to apply the corresponding color paint from the upper position, a second sprayer is used to apply the corresponding color paint from the lower position, and a third sprayer is used to apply the corresponding color paint from the middle position;

performing a self-cleaning process of each of the first sprayer, the second sprayer, and the third sprayer after steps (a) and (b) are repeated for n times, where n is a positive integer;

wherein the multi-layered pattern includes an upper-layer pattern area, a mid-layer pattern area, and a lower-layer pattern area that are different in color from each other;

wherein each of the first sprayer, the second sprayer, and the third sprayer is fixedly connected to a support by a position adjusting mechanism that includes a sliding member, a supporting arm, and an angle adjusting assembly, the sliding member is slidably disposed on the support, the supporting arm is fixedly connected to the sliding member, and the angle adjusting assembly is installed at one end of the supporting arm for fixing the first, second or third sprayer and adjusting its angle relative to the horizontal reference plane;

wherein the angle adjusting assembly includes a pivot, an adjusting rod, a fixing seat, and a dial indicator, the pivot is fixedly connected to the one end of the supporting arm, the adjusting rod is pivoted on the pivot, the fixing seat is integrated with the adjusting rod, and the dial indicator is disposed at one side of the fixing seat.

2. The method according to claim 1, wherein the upper position is an upper diagonal position of the semi-finished product of the golf ball, the lower position is a lower diagonal position of the semi-finished product of the golf ball, and the middle position is located between the upper diagonal position and the lower diagonal position.

3. The method according to claim 2, wherein in step (b), the semi-finished product of the golf ball is retained at a predetermined height and defines a horizontal reference plane, and the semi-finished product of the golf ball is divided into two half portions by the horizontal reference plane; wherein the upper diagonal position is above the horizontal reference plane, the lower diagonal position is below the horizontal reference plane, and the middle position is on the horizontal reference plane.

4. The method according to claim 3, wherein in step (b), the color paint applied from the upper position is sprayed onto the base layer along a first spray direction that is inclined downward at an angle from 20 degrees to 30 degrees relative to the horizontal reference plane, the color paint applied from the lower position is sprayed onto the base layer along a second spray direction that is inclined upward at an angle from 20 degrees to 30 degrees relative to the horizontal reference plane, and the color paint applied from the middle position is sprayed onto the base layer along a third spray direction that is parallel to the horizontal reference plane.

5. The method according to claim 4, wherein the color paint applied from the upper position has a viscosity from 18 seconds to 22 seconds measured by a No. 4 Zahn cup and at a temperature from 24° C. to 25° C., and an atomization pressure of the first sprayer is 1-3.5 $kg/cm^2$; wherein the color paint applied from the lower position has a viscosity from 18 seconds to 22 seconds measured by another No. 4 Zahn cup and at a temperature from 24° C. to 25° C., and an atomization pressure of the second sprayer is 1-3.5 $kg/cm^2$; wherein the color paint applied from the middle position has a viscosity from 18 seconds to 22 seconds measured by yet another No. 4 Zahn cup and at a temperature from 24° C. to 25° C., and an atomization pressure of the third sprayer is 1-3.5 $kg/cm^2$.

6. The method according to claim 5, wherein the first sprayer has a first spraying head, a shortest horizontal distance between the first spraying head and a center point of the ball-shaped body is from 10 cm to 25 cm, and a shortest vertical distance between the first spraying head and the horizontal reference plane is from 4 cm to 10 cm; wherein the second sprayer has a second spraying head, a shortest horizontal distance between the second spraying head and the center point of the ball-shaped body is from 10 cm to 25 cm, and a shortest vertical distance between the second spraying head and the horizontal reference plane is from 4 cm to 10 cm.

7. The method according to claim 1, wherein the base layer includes one or more base color layers.

8. The method according to claim 1, further comprising a step of forming an outer cover layer on the multi-layered pattern.

9. The method according to claim 8, wherein the outer cover layer includes one or more transparent coating layers.

* * * * *